United States Patent
Fujita et al.

(10) Patent No.: US 10,110,062 B2
(45) Date of Patent: Oct. 23, 2018

(54) WIRELESS POWER TRANSMISSION DEVICE

(71) Applicant: Panasonic Intellectual Property Management Co., Ltd., Osaka (JP)

(72) Inventors: Atsushi Fujita, Shiga (JP); Hideki Sadakata, Shiga (JP); Takashi Kashimoto, Nara (JP); Daisuke Bessyo, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 294 days.

(21) Appl. No.: 15/067,301

(22) Filed: Mar. 11, 2016

(65) Prior Publication Data
US 2016/0193930 A1    Jul. 7, 2016

Related U.S. Application Data

(63) Continuation of application No. PCT/JP2013/005493, filed on Sep. 17, 2013.

(51) Int. Cl.
*H01F 27/42* (2006.01)
*H01F 37/00* (2006.01)
(Continued)

(52) U.S. Cl.
CPC .............. *H02J 50/10* (2016.02); *B60L 11/182* (2013.01); *H02J 5/005* (2013.01); *H02J 7/025* (2013.01);
(Continued)

(58) Field of Classification Search
CPC ......... B60L 11/182; H02J 50/80; H02J 50/10; H02J 50/12; H02J 5/005; H02J 7/025; H02J 7/0029
(Continued)

(56) References Cited

U.S. PATENT DOCUMENTS

| | | | |
|---|---|---|---|
| 2012/0313579 A1 | 12/2012 | Matsumoto et al. | |
| 2013/0176652 A1* | 7/2013 | Kim | H02H 3/20 361/86 |
| 2013/0257168 A1* | 10/2013 | Singh | H02J 17/00 307/104 |

FOREIGN PATENT DOCUMENTS

| | | |
|---|---|---|
| JP | 2008-087733 | 4/2008 |
| JP | 2013-225962 | 10/2013 |

(Continued)

OTHER PUBLICATIONS

Extended European Search Report issued in application No. EP 13 89 4055 dated Jul. 26, 2016.
(Continued)

*Primary Examiner* — Carlos Amaya
(74) *Attorney, Agent, or Firm* — Pearne & Gordon LLP

(57) ABSTRACT

A wireless power transmission device comprises: a ground-side coil (13) for generating a magnetic field by current supplied from a power control device (7); a current transformer (23) for detecting the magnitude of an input from the power control device (7); a power supplying device-side control unit (6) for, based on a detection signal from the current transformer (23), controlling the current supplied from the power control device (7) to the ground-side coil (13); and a vehicle-side coil (15) for receiving power via the magnetic field coming from the ground-side coil (13). When detecting an input change having a predetermined value or more on the basis of the detection signal from the input detection unit (23), the power supplying device-side control unit (6) stops the current supplied to the ground-side coil (13).

3 Claims, 13 Drawing Sheets

(51) Int. Cl.
  *H01F 38/00*   (2006.01)
  *H02J 50/10*   (2016.01)
  *H02J 50/12*   (2016.01)
  *H02J 5/00*    (2016.01)
  *H02J 7/02*    (2016.01)
  *B60L 11/18*   (2006.01)
  *H02J 50/80*   (2016.01)
  *H02J 7/00*    (2006.01)

(52) U.S. Cl.
  CPC .............. *H02J 50/12* (2016.02); *H02J 50/80* (2016.02); *H02J 7/0029* (2013.01)

(58) Field of Classification Search
  USPC ........................................................ 307/104
  See application file for complete search history.

(56) References Cited

FOREIGN PATENT DOCUMENTS

WO    2011118371 A1   9/2011
WO    2013/056234 A2  4/2013

OTHER PUBLICATIONS

International Search Report dated Nov. 12, 2013 for PCT/JP2013/005493.

\* cited by examiner

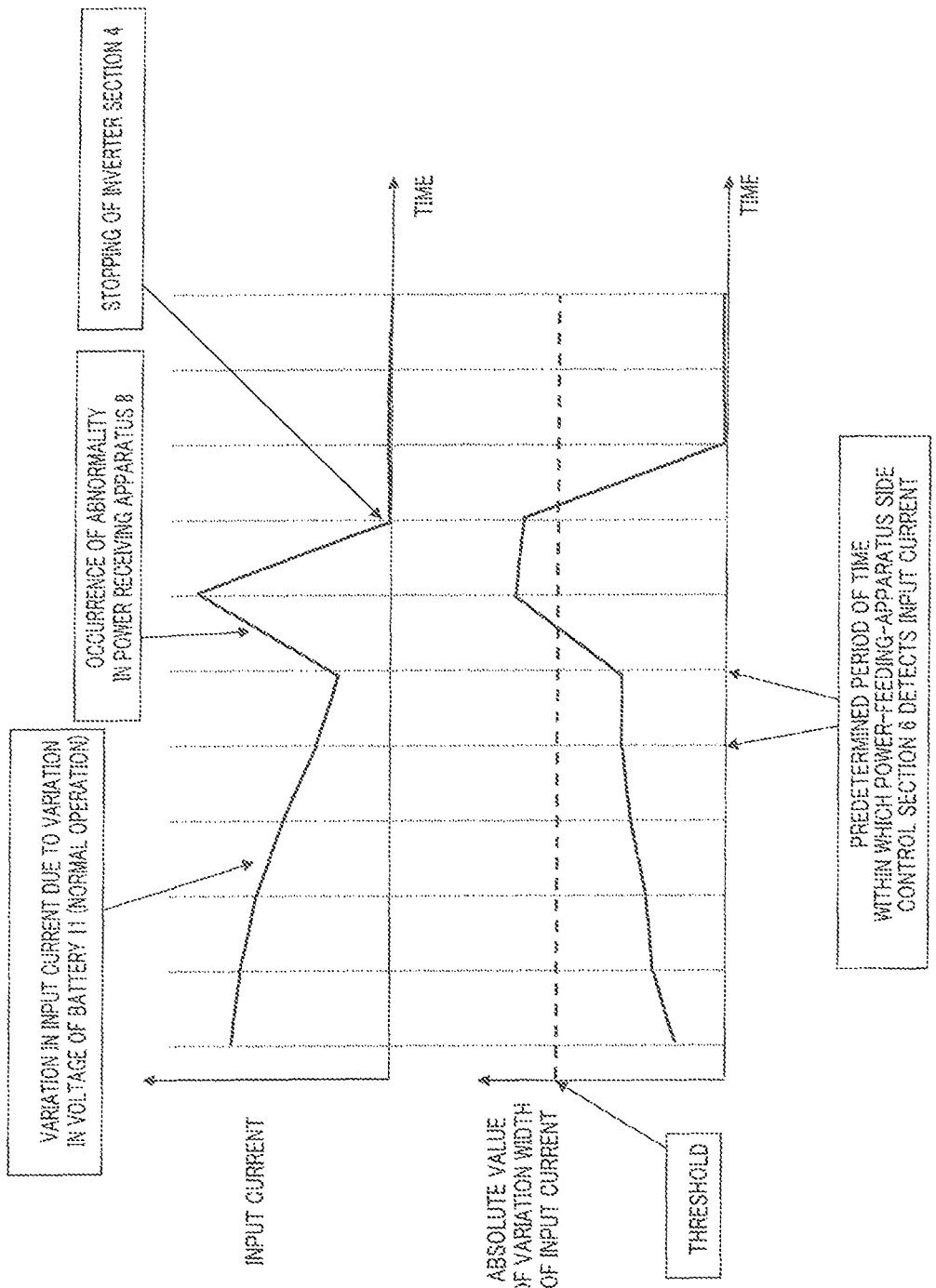

WIRELESS POWER TRANSMISSION DEVICE

TECHNICAL FIELD

The present invention relates to a contactless power transmission apparatus used for charging or the like of an electric propulsion vehicle such as an electric automobile or plug-in hybrid automobile.

BACKGROUND ART

FIG. 1 is a schematic diagram illustrating a configuration of contactless power transmission apparatus 106 according to the related art. In FIG. 1, a power feeding apparatus (primary side) F connected to a power panel of power supply 109 on a ground side is disposed so as to face a power receiving apparatus (secondary side) G with an air gap interposed in between and without any physical contact during power supply. This air gap is a void space. Power receiving apparatus G is mounted on an electric propulsion vehicle. In such a configuration, when an alternating current (AC) is given to primary coil 107 (power feeding coil) provided for power feeding apparatus F and a magnetic field is generated, an induced electromotive force is generated in secondary coil 108 (power receiving coil) provided for power receiving apparatus G. Power is thereby transmitted contactlessly from primary coil 107 to secondary coil 108.

Power receiving apparatus G is connected to, for example, vehicle-mounted battery 110, and vehicle-mounted battery 110 is charged with the power transmitted as described above. Vehicle-mounted motor 111 is driven by the power stored in battery 110. Note that necessary information is exchanged between power feeding apparatus F and power receiving apparatus G during contactless power supply processing via, for example, wireless communication apparatus 112.

FIGS. 2A and 2B are schematic diagrams illustrating an inner structure of power feeding apparatus F and power receiving apparatus G. Particularly, FIG. 2A is a schematic diagram illustrating an inner structure of power feeding apparatus F seen from above and power receiving apparatus G seen from below. FIG. 2B is a schematic diagram illustrating an inner structure of power feeding apparatus F and power receiving apparatus G seen laterally.

In FIGS. 2A and 2B, power feeding apparatus F includes primary coil 107, primary magnetic core 113, back plate 115 and cover 116 or the like. Briefly, power receiving apparatus G has a structure symmetric with respect to power feeding apparatus F and includes secondary coil 108, secondary magnetic core 114, back plate 115, and cover 116, for example. Surfaces of primary coil 107 and primary magnetic core 113 and surfaces of secondary coil 108 and secondary magnetic core 114 are respectively covered fixedly with mold resin 117 into which foamed material 118 is mixed.

Here, a relationship between primary coil 107 of power feeding apparatus F and secondary coil 108 of power receiving apparatus G in the related art will be described using a schematic diagram in FIG. 3. As illustrated in FIG. 3, primary coil 107 and secondary coil 108 are formed by spirally winding litz wires 121 and 122 which are a bundle of a plurality of elemental wires. When a vehicle is parked in a predetermined parking space, primary coil 107 of power feeding apparatus F on the ground side is disposed so as to face secondary coil 108 of power receiving apparatus G mounted on the vehicle. With primary coil 107 and secondary coil 108 facing each other, and a magnetic field generated from primary coil 107 interlinking with secondary coil 108 over a wide range, power is transmitted contactlessly.

CITATION LIST

Patent Literature

PTL 1
Japanese Patent Application Laid-Open No. 2008-87733

SUMMARY OF INVENTION

Technical Problem

As illustrated in FIG. 3, there is an air gap between primary coil 107 and secondary coil 108 in the contactless power transmission apparatus according to the related art. Thus, information on voltage, current, and power or the like at power receiving apparatus G is transmitted to power feeding apparatus F by wireless communication apparatus 112. Wireless communication apparatus 112 performs processing such as information processing, encryption processing for preventing crosstalk, and device authentication processing in parallel, and thus the speed of wireless communication is restricted to a certain degree.

Further, when some malfunction occurs in power receiving apparatus it is necessary to stop power transmission from power feeding apparatus F immediately. For example, a relay or the like for switching to another device is disposed between power receiving apparatus G and battery 110. Consider a situation where the relay for switching to another device is opened due to some malfunction during power transmission, thus leading to the open-load condition of power receiving apparatus G. When the speed of wireless communication is insufficient in this situation and thus allows the power transmission to continue from power feeding apparatus F, the inside of power receiving apparatus G may suffer overvoltage, which may break power receiving apparatus G.

It is desirable that power feeding apparatus F detect abnormal conditions with power feeding apparatus F alone and handle the abnormal conditions including the overvoltage condition of power receiving apparatus G in consideration of a case where malfunction occurs to the wireless communication itself.

An object of the present invention is to provide a contactless power transmission apparatus capable of preventing breaking a power receiving apparatus by detecting input of a power supply, and by stopping supply of a current to a primary coil when the variation width of magnitude of the input is equal to or more than a predetermined value.

Solution to Problem

In order to achieve the above described object, the present invention employs the following configuration.

A contactless power transmission apparatus according to an aspect of the present invention includes: a primary coil that generates a magnetic field through a current supplied from a power supply; an input detection section that detects a magnitude of input from the power supply; a control section that controls the current supplied from the power supply to the primary coil based on a detection signal of the input detection section; and a secondary coil that receives power through a magnetic field from the primary coil, in which the control section stops supply of a current to the primary coil when an input variation equal to or more than a predetermined value is detected based on a detection signal of the input detection section.

Advantageous Effects of Invention

The primary coil and the secondary coil are opposite to each other with a gap interposed therebetween, and thus the degree of magnetic coupling of the primary coil relative to the secondary coil is low, with apparent impedance being small. That is, the steepness (Q) of resonance is high, and the frequency characteristics of input power, output power, and the like are extremely steep.

For example, the input power increases or decreases abruptly when the apparent impedance seen from the primary coil varies in the case where a malfunction occurs to a relay connecting a rectification section with a battery or the like, which is a load, and causes a sudden open-load condition, or in the case where a short-circuit breakdown or the like of the secondary coil occurs.

The present invention includes an input detection section that detects the magnitude of power or the like input to a power supply, and a control section that controls a current supplied from the power supply to a primary coil based on a detection signal of the input detection section; when the control section detects a variation in magnitude of input equal to or more than a predetermined value, supply of a current to the primary coil is stopped, and thus it is possible to detect abnormality in a secondary coil, a rectification section, or the like without using wireless communication to quickly move on to a safe operation.

BRIEF DESCRIPTION OF DRAWINGS

FIG. 13 is a graph of Variation 4 illustrating temporal variations in an input current recognized by a power-feeding-apparatus side control section and in an absolute value of a variation width of the input current.

DESCRIPTION OF EMBODIMENT

A contactless power transmission apparatus according to an aspect of the present invention includes: a primary coil that generates a magnetic field through a current supplied from a power supply; an input detection section that detects a magnitude of input from the power supply; a control section that controls the current supplied from the power supply to the primary coil based on a detection signal of the input detection section; and a secondary coil that receives power through a magnetic field from the primary coil, in which the control section stops supply of a current to the primary coil when an input variation equal to or more than a predetermined value is detected based on a detection signal of the input detection section.

Such a configuration allows the control section to control the power supply to stop supply of a current to the primary coil when the control section detects a variation in magnitude of input equal to or more than a predetermined value. Therefore, it is possible to detect abnormality in the secondary coil, the rectification section, or the like without using wireless communication to quickly move on to a safe operation.

Embodiment

Hereinafter, an embodiment of the present invention will be described with reference to the accompanying drawings. Note that the present embodiment is not intended to limit the present invention.

Figure 1:
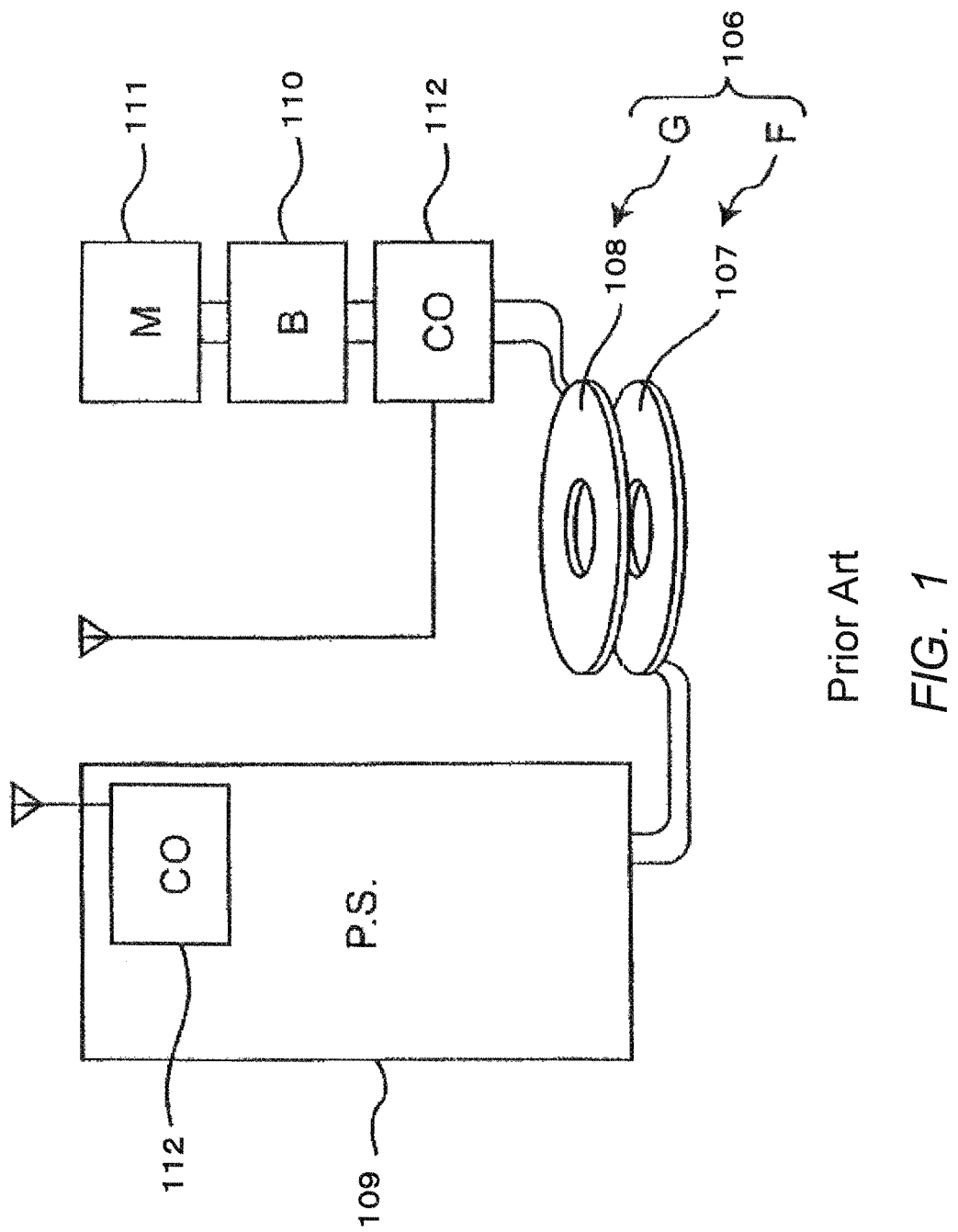
FIG. 1 is a schematic diagram illustrating a configuration of a contactless power transmission apparatus according to the related art.
Figure 2A:
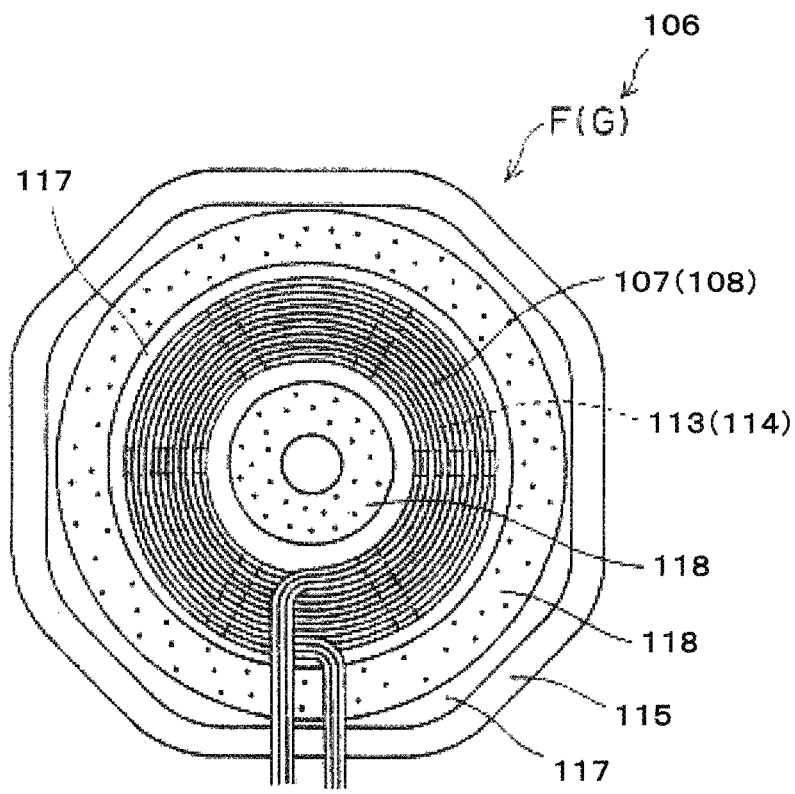
FIGS. 2A and 2B are diagrams illustrating an inner structure of a power receiving apparatus (power feeding apparatus) disposed opposite to a power feeding apparatus (power receiving apparatus) in FIG. 1.
Figure 2B:
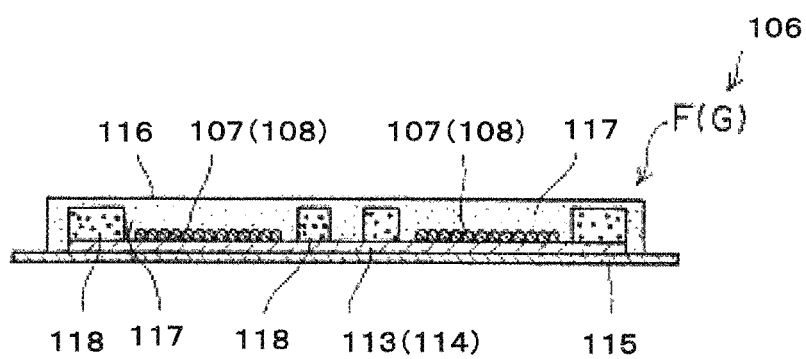
Figure 3:
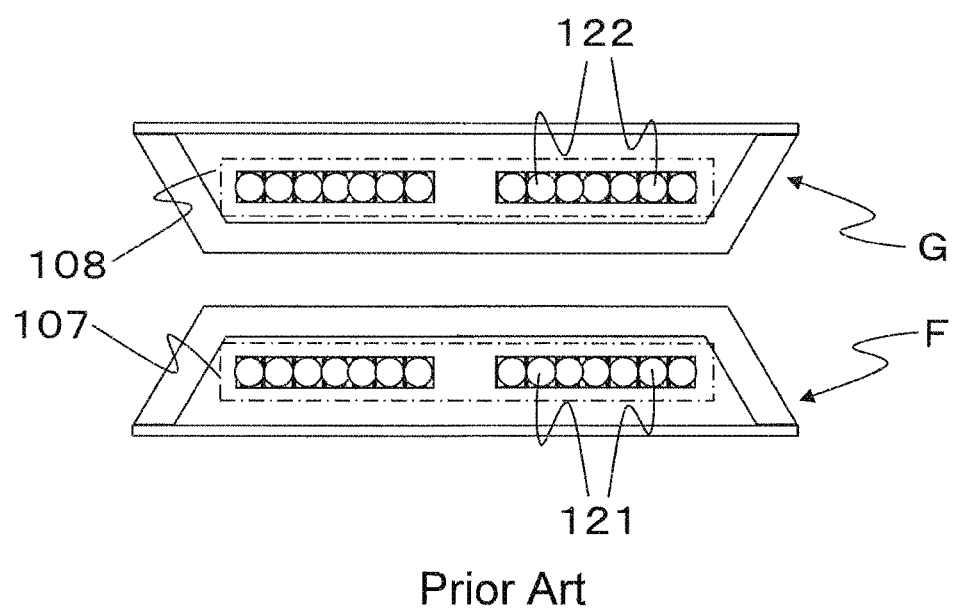
FIG. 3 is a cross-sectional view of the power feeding apparatus and the power receiving apparatus in FIGS. 2A and 2B.
Figure 4:
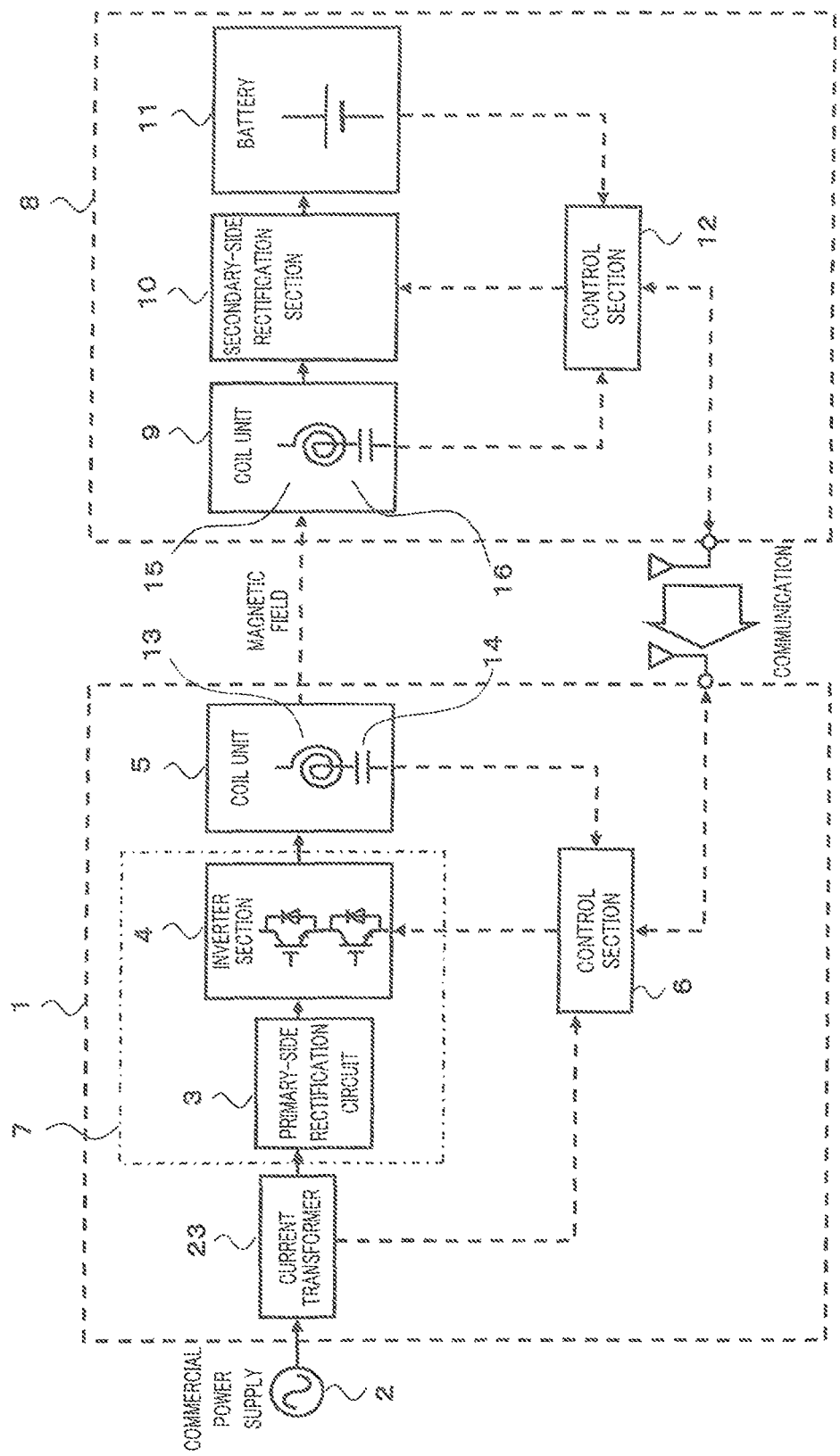
FIG. 4 is a block diagram of a contactless power transmission apparatus according to an embodiment of the present invention.
Figure 5:
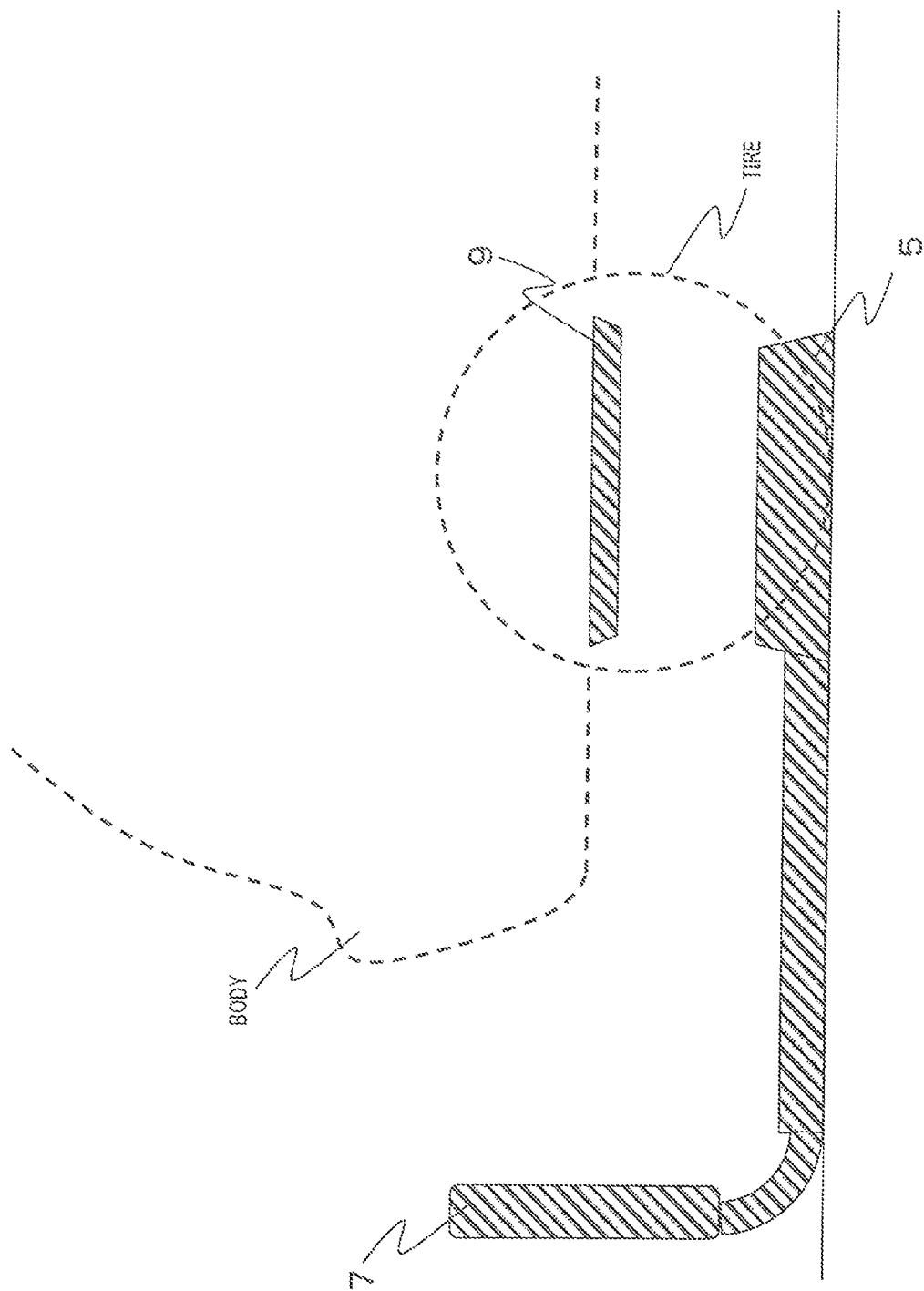
FIG. 5 is an outline view of the contactless power transmission apparatus in FIG. 4.
Figure 6:
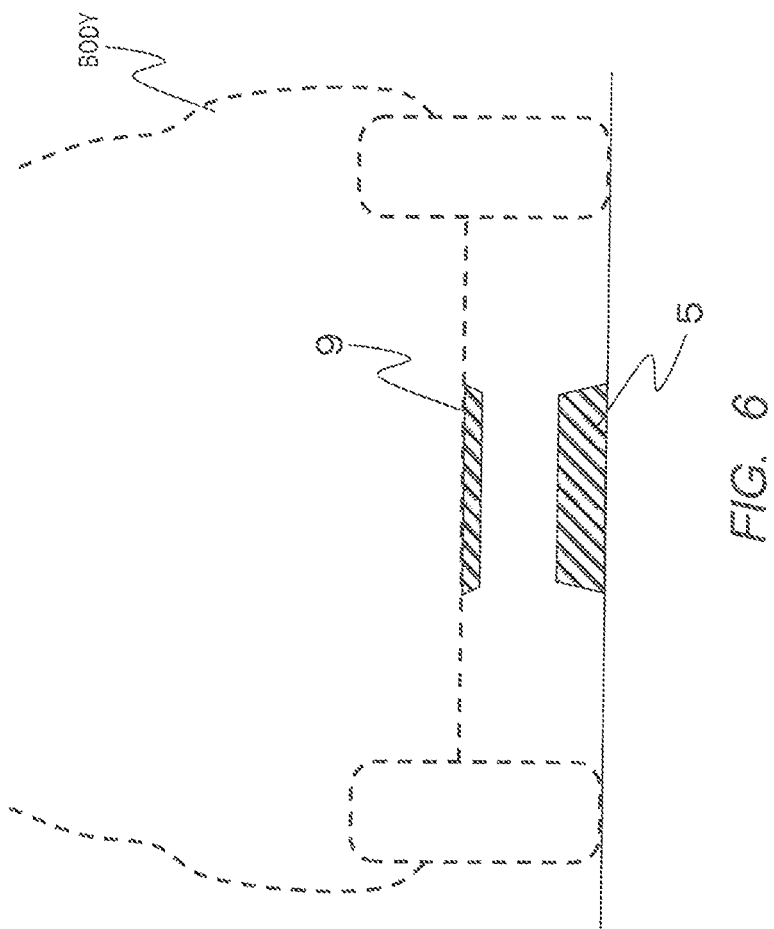
FIG. 6 is an outline view of the contactless power transmission apparatus in FIG. 4.

FIG. 4 is a block diagram of a contactless power transmission apparatus according to the present invention. FIGS. 5 and 6 are outline views of a vehicle placed in a parking space. As illustrated in FIGS. 4, 5 and 6, the contactless power transmission apparatus is composed of power feeding apparatus 1 placed, for example, in a parking space, and power receiving apparatus 8 mounted on, for example, an electric propulsion vehicle.

Power feeding apparatus 1 includes primary-side rectification circuit 3 connected to AC power supply 2, inverter section 4, ground-side coil unit 5, control section (power-feeding-apparatus side control section, for example, microcomputer) 6, and input detection section (for example, current transformer that detects an input current) 23. Primary-side rectification circuit 3 and inverter section 4 constitute power control apparatus 7 which is a high-frequency power supply. Further, power receiving apparatus 8 includes vehicle-side coil unit 9, secondary-side rectification section 10 which is a rectification section that rectifies power, battery 11 which is a load, and control section (power-receiving-apparatus side control section, for example, microcomputer) 12.

In power feeding apparatus 1, AC power supply 2 is a 200 V commercial power supply which is a low-frequency AC power supply, and is connected to an input end of primary-side rectification circuit 3, an output end of primary-side rectification circuit 3 is connected to an input end of inverter section 4, and an output end of inverter section 4 is connected to ground-side coil unit 5. Meanwhile, in power receiving apparatus 8, an output end of vehicle-side coil unit 9 is connected to an input end of secondary-side rectification section 10, and an output end of secondary-side rectification section 10 is connected to battery 11.

Ground-side coil unit 5 is installed on the ground, and power control apparatus 7 is installed in an upright position at a predetermined distance from, for example, ground-side coil unit 5 (see FIG. 5). Meanwhile, vehicle-side coil unit 9 is attached to, for example, a body bottom section (e.g., chassis).

Ground-side coil 13 which is a primary coil and ground-side resonance capacitor 14 are installed inside ground-side coil unit 5 which is placed on the ground. Ground-side coil 13 and ground-side resonance capacitor 14 are connected in series, and their other terminals are connected to the output end of inverter section 4.

Similarly, vehicle-side coil 15 which is a secondary coil and vehicle-side resonance capacitor 16 are installed inside vehicle-side coil unit 9 attached to the body bottom section. Vehicle-side coil 15 and vehicle-side resonance capacitor 16 are connected in series, and their other terminals are connected to the input end of secondary-side rectification section 10.

A resonance frequency between ground-side coil 13 and ground-side resonance capacitor 14 is set to be substantially identical to a resonance frequency between vehicle-side coil 15 and vehicle-side resonance capacitor 16. Specifically, in the present embodiment, the number of turns of each of ground-side coil 13 and vehicle-side coil 15 is 30. Note that, in FIG. 7 to be described hereinafter, the number of turns of each of ground-side coil 13 and vehicle-side coil 15 is illustrated in a simplified manner.

Figure 7:
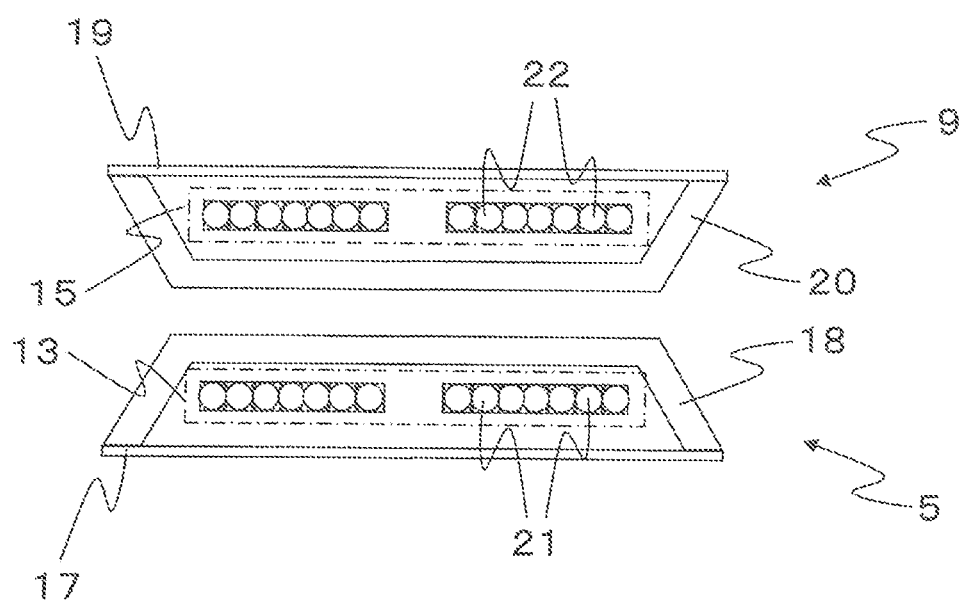
FIG. 7 is a cross-sectional view of a ground-side coil unit and a vehicle-side coil unit.

FIG. 7 is a cross-sectional view of portions of ground-side coil 13 and vehicle-side coil 15 in particular in ground-side coil unit 5 and vehicle-side coil unit 9 of the contactless power transmission apparatus of the present embodiment. As illustrated in FIG. 7, ground-side coil unit 5 includes base 17 fixed on the ground side, ground-side coil 13 installed on base 17, and cover 18 which is a case that covers ground-side coil 13. Vehicle-side coil unit 9 includes base 19 fixed to the body, vehicle-side coil 15 installed on base 19, and cover 20 which is a case that covers vehicle-side coil 15.

Ground-side coil 13 is formed by spirally winding coil wire 21 to form a plurality of turns, and similarly, vehicle-side coil 15 is formed by spirally winding coil wire 22 to form a plurality of turns. Ground-side coil 13 and vehicle-side coil 15 each have a circular-plate shape and are designed to have substantially the same outer and inner diameters. Litz wires are used as coil wires 21 and 22 of ground-side coil 13 and vehicle-side coil 15, but other conductive wires may also be used.

In the above-described configuration, power-feeding-apparatus side control section 6 wirelessly communicates with power-receiving-apparatus side control section 12, and power-receiving-apparatus side control section 12 determines a power command value according to a detected residual voltage of battery 11 and sends the determined power command value to power-feeding-apparatus side control section 6. At the same time, power-receiving-apparatus side control section 12 transmits the voltage and current of battery 11 and receiving power calculated therefrom to power-feeding-apparatus side control section 6. Power-feeding-apparatus side control section 6 compares the received power command value with the actual receiving power, and drives inverter section 4 so as to obtain receiving power corresponding to the power command value within a range not exceeding rated input power of power feeding apparatus 1.

More specifically, power-feeding-apparatus side control section 6 starts driving inverter section 4 at a high frequency, by a predetermined width, apart from a resonance frequency between ground-side coil 13 and ground-side resonance capacitor 14 and a resonance frequency between vehicle-side coil 15 and vehicle-side resonance capacitor 16. The reason that driving is started at a high frequency apart from the resonance frequencies is that being apart from the resonance frequencies makes the impedance seen from ground-side coil 13 and inverter section 4 higher and makes it possible to suppress the output power to a low level and avoid a transient overloaded operation state (overvoltage and overcurrent) immediately after the driving starts.

After that, power-feeding-apparatus side control section 6 causes the drive frequency of inverter section 4 to gradually decrease to approach the resonance frequencies. The impedance seen from ground-side coil 13 and inverter section 4 decreases and the receiving power gradually increases.

During a power supply, power-receiving-apparatus side control section 12 detects receiving power and changes a power command value for power-feeding-apparatus side control section 6 so that no overcurrent or overvoltage is applied to battery 11.

In power feeding apparatus 1, current transformer 23 which is an input detection section outputs a voltage in accordance with the magnitude of an input current input to power feeding apparatus 1, and then outputs a detection signal in accordance with the magnitude of the input current to power-feeding-apparatus side control section 6 via a circuit (not illustrated) that rectifies an output voltage. Power-feeding-apparatus side control section 6 recognizes the magnitude of an input current from the detection signal, estimates the input current from a voltage of a commercial power supply connected to power feeding apparatus 1, and controls inverter section 4 to autonomously limit transmission power to power receiving apparatus 8 so as not to exceed rated input power. When the input power exceeds the rated input power, or when the receiving power of power receiving apparatus 8 exceeds the power command value, power-feeding-apparatus side control section 6 sets the drive frequency of inverter section 4 to be higher. Further, when the input power does not reach the rated input power and the receiving power of power receiving apparatus 8 does not reach the power command value, either, power-feeding-apparatus side control section 6 sets the drive frequency of inverter section 4 to be lower.

As illustrated in FIGS. 5 and 6, when power is supplied from power feeding apparatus 1 to power receiving apparatus 8, vehicle-side coil unit 9 is located opposite to ground-side coil unit 5 by moving the body (vehicle) as appropriate. Power-feeding-apparatus side control section 6 controls driving of inverter section 4 to thereby cause ground-side coil 13 to generate a high-frequency magnetic field. In vehicle-side coil 15, an induced electromotive force is generated by the magnetic field of ground-side coil 13 disposed opposite thereto and a high-frequency current is induced in vehicle-side coil 15. Power receiving apparatus 8 extracts power using this high-frequency current and charges battery 11 with the extracted power.

At this time, power-feeding-apparatus side control section 6 and power-receiving-apparatus side control section 12 pair with each other in order to prevent crosstalk and erroneous operation due to noise or the like from the outside, and communicate information while sending and receiving authentication signals. At the same time, in order to prevent interception of wireless communication by others, or reception of misinformation transmitted intentionally, information is encrypted for wireless communication, and decoding processing is performed on the receiving side. Thus, processing is highly concentrated on the wireless communication portions of power-feeding-apparatus side control section 6 and power-receiving-apparatus side control section 12. Further, an increase in the speed of wireless communication may broaden the wireless communication frequency band, which may affect the wireless communication in other channels communicating at the same frequency, or may increase heat generation of the wireless communication portions of power-feeding-apparatus side control section 6 and power-receiving-apparatus side control section 12.

Therefore, the wireless communication portions of power-feeding-apparatus side control section 6 and power-receiving-apparatus side control section 12 must reduce the influence received by the outside noise while suppressing the influence on other wireless communication, so that there is a limit to the amount of information communicable by the wireless communication and the speed thereof.

Meanwhile, while ground-side coil 13 and vehicle-side coil 15 are opposite to each other, there is a distance therebetween, and thus the degree of magnetic coupling of ground-side coil 13 relative to vehicle-side coil 15 is low, with apparent impedance being small. That is, the steepness (Q) of resonance is high, and the frequency characteristics of input power, output power, and the like are extremely steep.

For example, as in the case where vehicle-side coil 15 undergoes variation in inductance due to layer short, disconnection or the like, or as in the case where the malfunction of a vehicle-side component causes opening/short-circuit, when the apparent impedance seen from ground-side coil 13 varies, frequency characteristics of input power, output power, and the like vary, thus causing the input power to increase or decrease abruptly at a frequency at which inverter section 4 operates.

Figure 8:
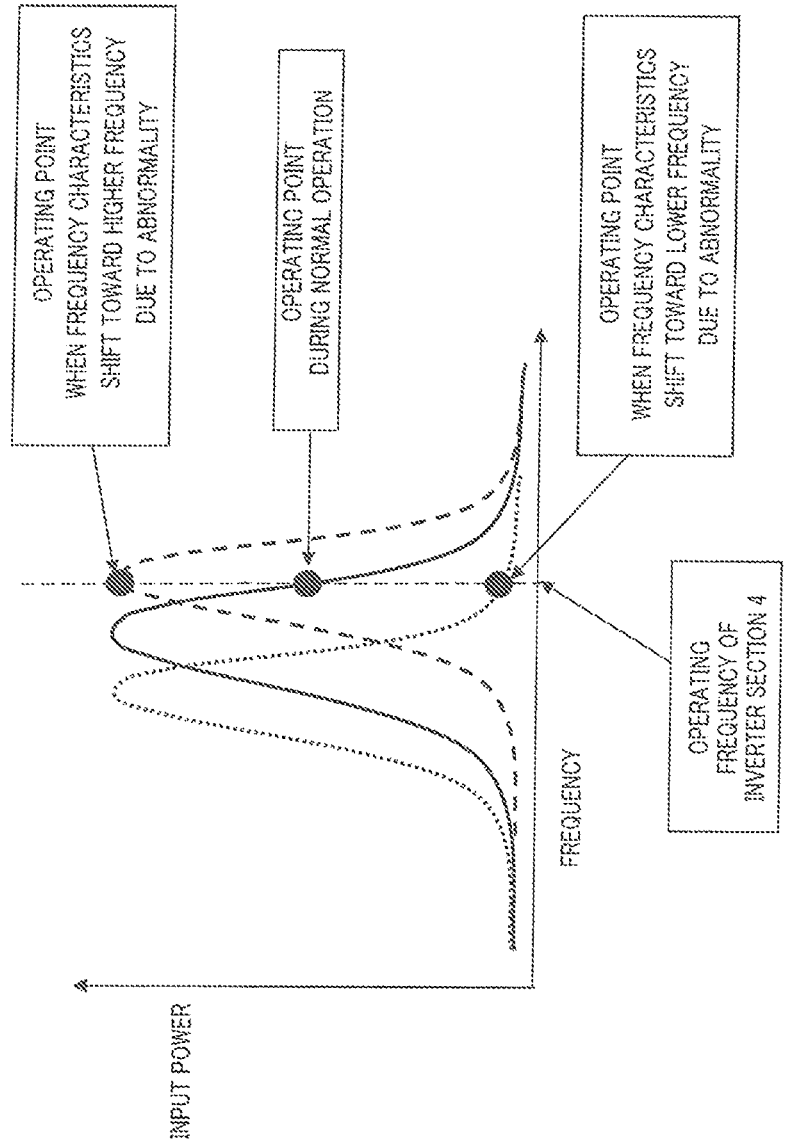
FIG. 8 is a graph illustrating a variation in frequency characteristic of input power during normal operation and abnormal operation.

FIG. 8 is a graph in which the horizontal axis represents a frequency and the vertical axis represents input power. For example, when vehicle-side coil 15 is short-circuited due to layer short, the inductance decreases, and thus the resonance frequency becomes higher, which causes the frequency characteristic of input power to shift toward a higher frequency. Therefore, when inverter section 4 continues the operation at the same frequency, the input power increases abruptly. On the other hand, when a component of power receiving apparatus 8 undergoes an open breakdown, the impedance seen from ground-side coil 13 varies, and thus the resonance frequency becomes lower, which causes the frequency characteristic of the input power to shift toward a lower frequency. Therefore, the input power decreases abruptly in this case.

Due to the above-mentioned malfunction or the like, power, a voltage, and a current to be received by power-receiving apparatus 8 also vary largely, and thus it is possible for power-receiving-apparatus side control section 12 to detect the variations in power, a voltage, and a current and transmit information to power-feeding-apparatus side control section 6 by wireless communication.

However, the variations in power, a voltage, and a current to be received by power-receiving apparatus 8 during abnormality are very fast variations of about several hundred μsec, and thus it is difficult for the wireless communication which performs mutual authentication, encryption and decoding, while suppressing the influence on other communications to secure sufficiently faster speed than the variation speeds of power, a voltage, and a current. There is a fear that insufficient transmission of information by wireless communication may lead to secondary damage to the components of power feeding apparatus 1 and power receiving apparatus 8 due to excessive input power.

Figure 9:
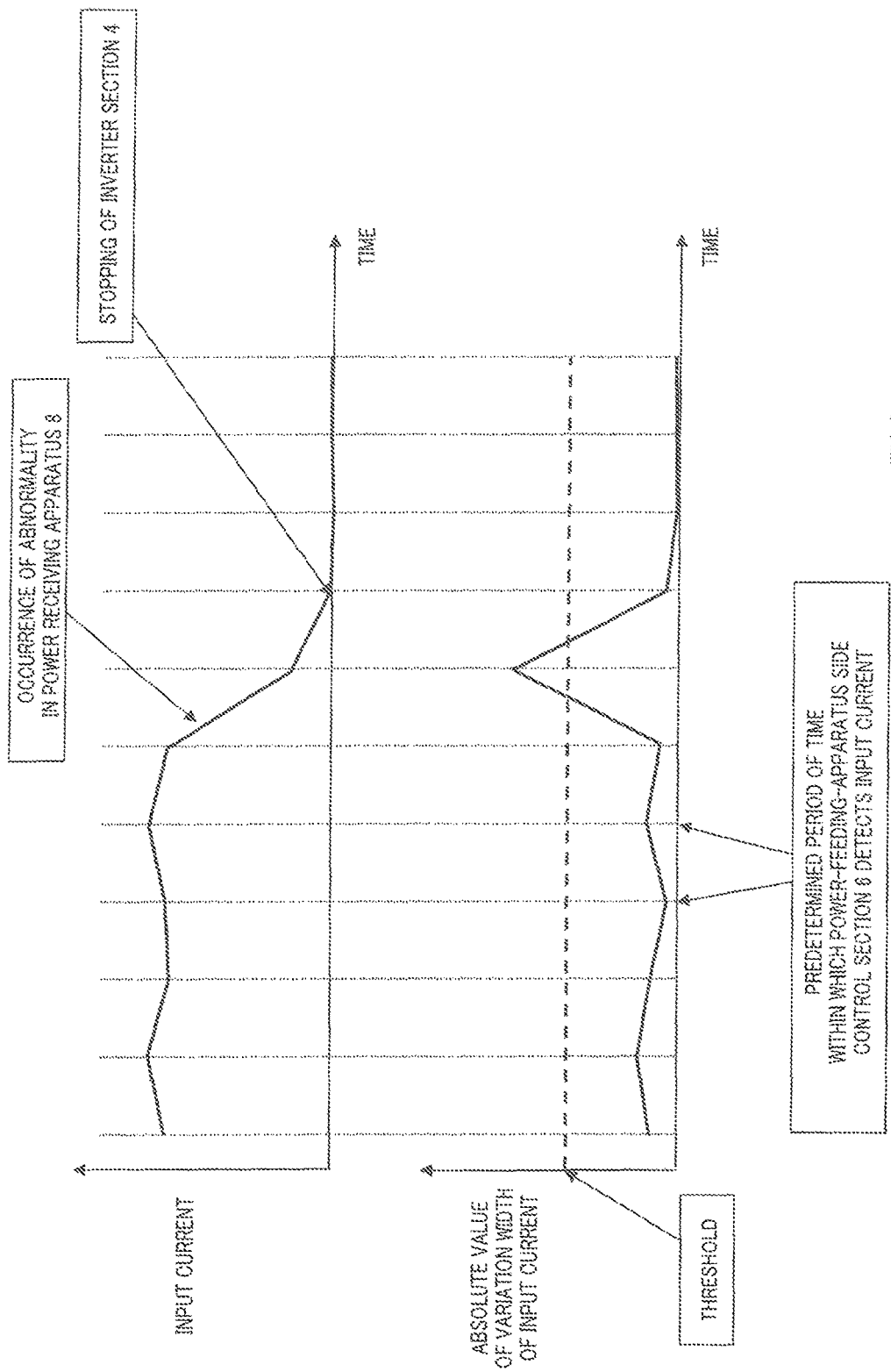
FIG. 9 is a graph illustrating temporal variations in an input current recognized by a power-feeding-apparatus side control section and in an absolute value of a variation width of the input current.

In the present embodiment, power feeding apparatus 1 includes current transformer 23 which is an input detection section. The detection signal of current transformer 23 is input to power-feeding-apparatus side control section 6. FIG. 9 is a graph illustrating temporal variations in an input current during power feeding operation recognized by power-feeding-apparatus side control section 6 and in an absolute value of a variation width of the input current. As illustrated in FIG. 9, power-feeding-apparatus side control section 6 recognizes, through AD conversion, a detection signal in accordance with the magnitude of an input current at a predetermined time interval. Further, power-feeding-apparatus side control section 6 retains therein a threshold of acceptable variation width of an input current within a predetermined period of time, and compares an input current newly recognized through AD conversion this time with an input current having been recognized through AD conversion up to this time to determine whether the input current exceeds the threshold of acceptable variation width. When the input current exceeds the threshold of acceptable variation width, power-feeding-apparatus side control section 6 immediately stops driving inverter section 4 irrespective of wireless communication from power-receiving-apparatus side control section 12 to stop feeding power to power receiving apparatus 8. Therefore, for example, as in the case where vehicle-side coil 15 undergoes variation in inductance due to layer short or disconnection, or as in the case where the malfunction of a vehicle-side component causes opening/short-circuit, even when the apparent impedance seen from ground-side coil 13 varies to thereby cause the input power to increase or decrease abruptly or cause the power to be received by power receiving apparatus 8 to increase or decrease abruptly, it is possible to securely stop feeding power to power receiving apparatus 8.

Figure 10:
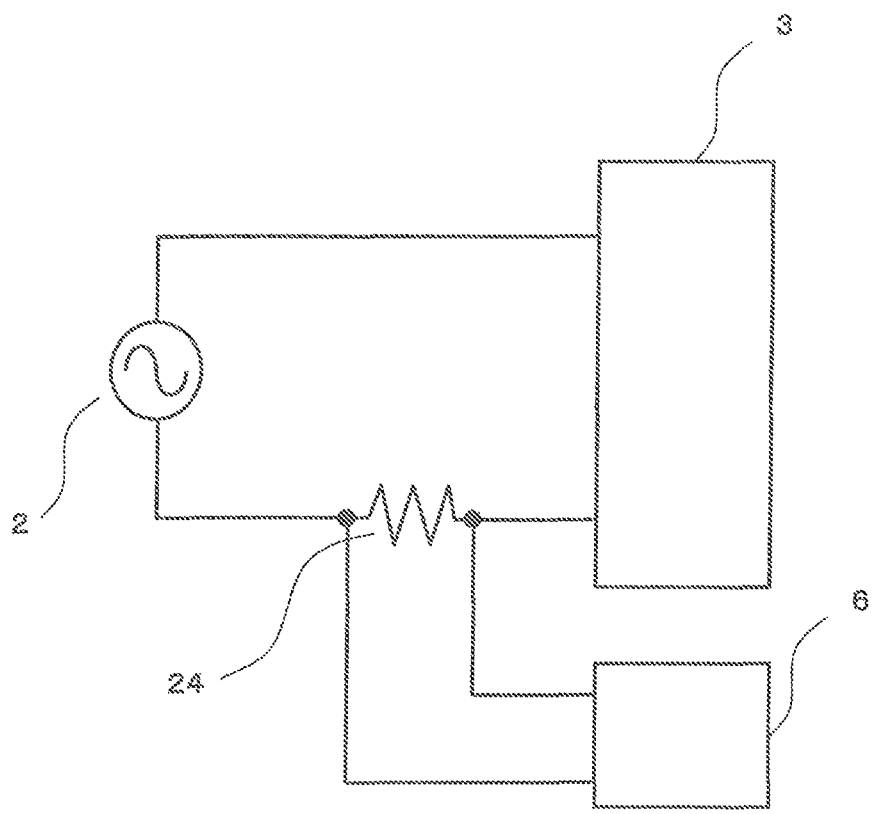
FIG. 10 is a block diagram of Variation 1 of an input detection section.

The present embodiment provides an example of using current transformer 23 for an input detection section; however, as illustrated, for example, in FIG. 10, resistor 24 may be inserted in series into a power line connecting AC power supply 2 to power feeding apparatus 1 to detect a voltage generated across the terminals of resistor 24 for detection of magnitude of the input. A suitable input detection section may be provided, depending on power feeding apparatus 1.

Figure 11:
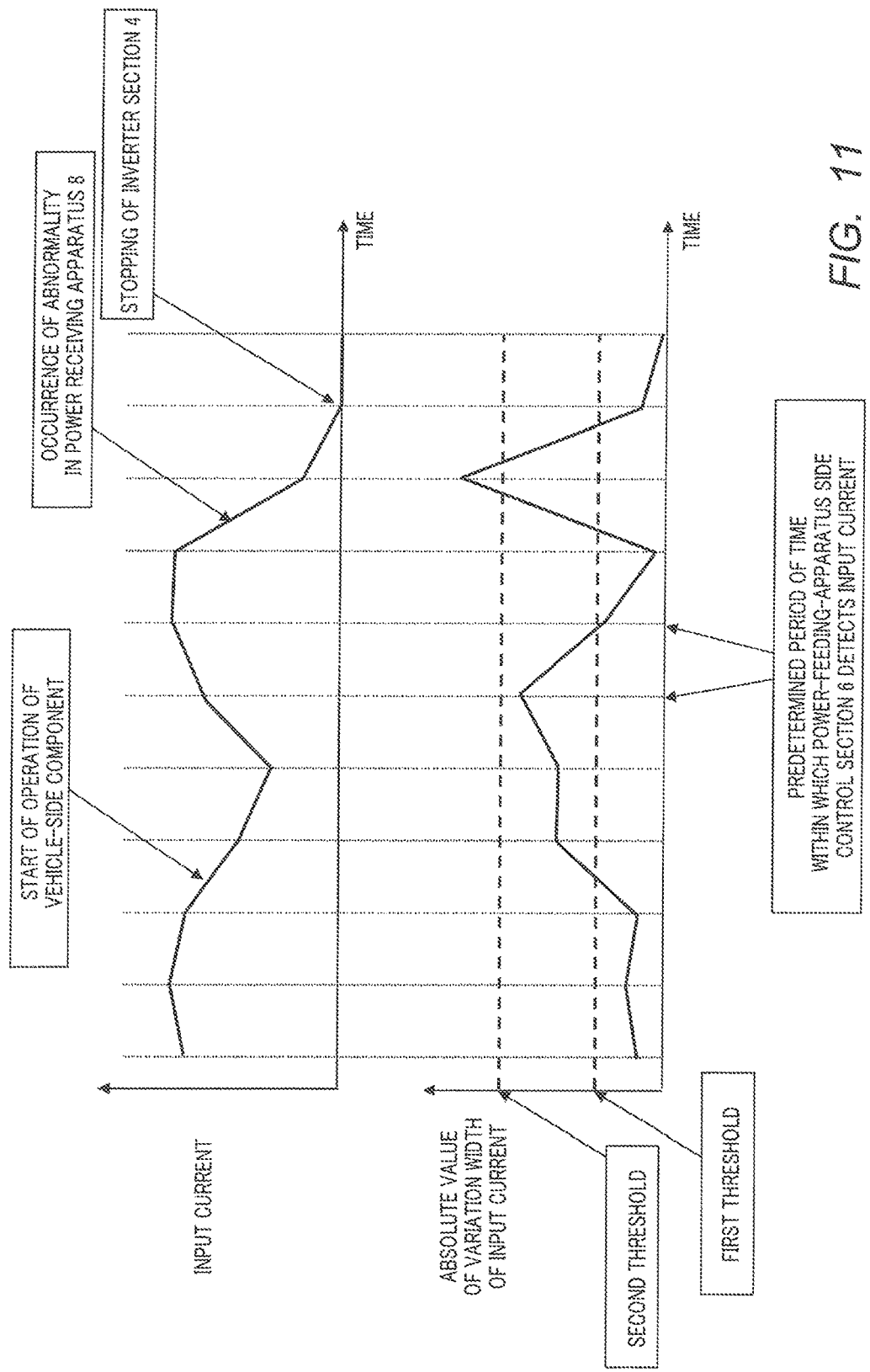
FIG. 11 is a graph of Variation 2 illustrating temporal variations in an input current recognized by a power-feeding-apparatus side control section and in an absolute value of a variation width of the input current.

In addition, while an example is provided in which power-feeding-apparatus side control section 6 immediately stops driving inverter section 4 when the input current exceeds the threshold of acceptable variation width of magnitude of the input; however, power-feeding-apparatus side control section 6 is not construed to be limited to this example. Similarly to FIG. 9, FIG. 11 is a graph illustrating temporal variations in an input current during power feeding operation recognized by power-feeding-apparatus side control section 6 and in an absolute value of a variation width of the input current.

Even when, for example, a heater or the like which is a vehicle-side component is connected to between power receiving apparatus 8 and battery 11 to allow the heater or the like to be operated or stopped by the vehicle-side control section, the apparent impedance seen from ground-side coil 13 varies, and thus similar variations in input power, receiving power, and the like occur. Here, battery 11 is disposed outside power receiving apparatus 8. However, the variation is smaller than that in the case of opening/short-circuit due to malfunction of a component, and thus variation in magnitude of the input also becomes smaller. Accordingly, power-feeding-apparatus side control section 6 has a first threshold of acceptable variation width of magnitude of the input and a second threshold of acceptable variation width greater than that of the first threshold. When the variation width of magnitude of the input exceeds the first threshold due to, for example, the operation of a vehicle-side component, but does not exceed the second threshold, power-feeding-apparatus side control section 6 does not stop driving inverter section 4 and controls the input power to be decreased, thus making possible to continue stable power feeding. When the variation width of magnitude of the input exceeds the second threshold due to, for example, the malfunction of a component, power-feeding-apparatus side control section 6 performs a control to immediately stop driving inverter section 4 to thereby reduce the number of stopping times of power feeding apparatus 1, thus making possible to continue stable power feeding.

Figure 12:
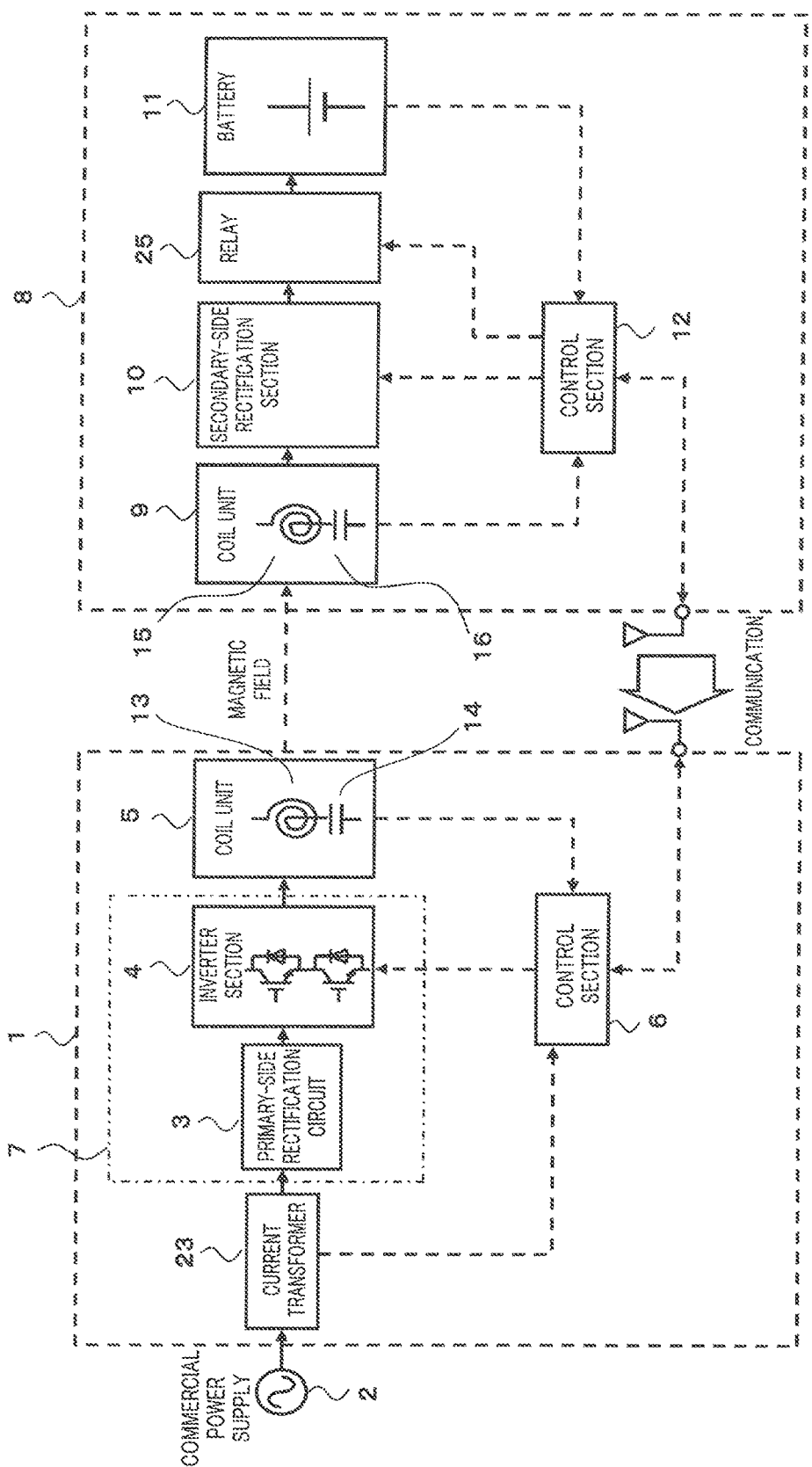
FIG. 12 is a block diagram of Variation 3 of a contactless power transmission apparatus.

Further, as illustrated in FIG. 12, relay 25 which is a connection section for switching between conduction and cutoff is typically provided between power receiving apparatus 8 and battery 11, in order to avoid electrical interference with other vehicle-side components. Here, battery 11 is disposed outside power receiving apparatus 8. The relay 25 is controlled by power-receiving-apparatus side control section 12 so as to switch between conduction and cutoff, and is designed to be conducted during power transmission from power feeding apparatus 1 to power receiving apparatus 8 and to be cut off in other occasions. For example, as in the case where impact is applied to a vehicle, or as in the case where the power supply voltage of power-receiving-apparatus side control section 12 is lowered, during the power transmission from power feeding apparatus 1 to power receiving apparatus 8, when relay 25 is cut off at a timing when relay 25 should be conducted, the connection of power receiving apparatus 8 to battery 11 is cut off. Thus, the apparent impedance seen from ground-side coil 13 varies largely to cause variations in input power, receiving power, and the like to occur.

Even in this case, power-feeding-apparatus side control section 6 can perform detection and can perform stopping without any problem, and thus can also serve the role of relay 25 of detecting erroneous operation, which relay 25 is a connection section for switching between conduction and cutoff disposed between power receiving apparatus 8 and battery 11.

Further, the voltage of battery 11 varies at different speeds, depending on power to be received by power receiving apparatus 8, the volume of battery 11, and the distance or the degree of magnetic coupling between ground-side coil 13 and vehicle-side coil 15. Similarly to FIGS. 9 and 11, FIG. 13 is a graph illustrating temporal variations in an input current during power feeding operation recognized by power-feeding-apparatus side control section 6 and in an absolute value of a variation width of the input current.

The variation in the voltage of battery 11 leads to the variation in apparent impedance seen from ground-side coil 13; thus, for example, when the control of power-feeding-apparatus side control section 6 over inverter section 4 is slower than the variation in the voltage of battery 11, variations in input power, receiving power, and the like occur. Therefore, by providing a threshold for a variation which occurs for a shorter period of time than the time of the variation of input magnitude caused by the variation in apparent impedance due to, for example, the variation in the voltage of battery 11 which may occur during a normal operation, it becomes possible for power-feeding-apparatus side control section 6 to detect only the period of abnormality. For example, by setting a threshold of acceptable variation width of magnitude of the input within a predetermined period of time, which is retained by power-feeding-apparatus side control section 6, to be greater than the variation width of magnitude of the input within a predetermined period of time which may occur during normal operation, it becomes possible to detect only the period of abnormality.

Noted that, the present embodiment provides an example of detecting the period of abnormality with the variation in magnitude of the input. For example, when detecting a voltage to be generated, or a current flowing in ground-side coil 13 or vehicle-side coil 15, the voltage or current depends on apparent impedance and input power. Therefore, when the apparent impedance becomes lower due to some malfunction than apparent impedance during normal operation, and as a result the frequency characteristic of the input power varies to cause the input power to be lowered, there are almost no variations in coil currents and voltages, causing a case where detection is not possible during abnormality. Accordingly, it is desirable to perform detection with input magnitude.

Although the above description provides as an example a case where power feeding apparatus 1 is disposed on the ground side, and power receiving apparatus 8 is mounted on a vehicle, the present invention is also applicable to a configuration in which the power receiving apparatus is disposed on the ground side and the power feeding apparatus is disposed on the vehicle side.

Note that some of the above-described various embodiments may be optionally combined as appropriate so as to exert their effects.

The disclosure of Japanese Patent Application No. 2012-096351, filed on Apr. 20, 2012, including the specification, drawings and abstract is incorporated herein by reference in its entirety.

INDUSTRIAL APPLICABILITY

According to the present invention, it is possible to detect abnormality in a secondary coil, a rectification section, or the like without using wireless communication to quickly move on to a safe operation. Therefore, it is applicable to a power feeding apparatus and a power receiving apparatus of contactless power transmission used for charging or the like of an electric propulsion vehicle such as an electric automobile or plug-in hybrid automobile.

REFERENCE SIGNS LIST

2 AC power supply
6 Power-feeding-apparatus side control section
7 High-frequency power supply (power control apparatus)
10 Secondary-side rectification section
11 Load (battery)
13 Primary coil (ground-side coil)
15 Secondary coil (vehicle-side coil)
23 Input detection section (current transformer)

The invention claimed is:

1. A contactless power transmission apparatus, comprising:
   a power feeding apparatus that includes a primary coil that generates a magnetic field through a current supplied from a power supply; an input detection section that detects magnitude of input from the power supply and a control section that controls the current supplied from the power supply to the primary coil based on a detection signal of the input detection section; and a power receiving apparatus that includes a secondary coil that receives power through a magnetic field from the primary coil, wherein the control section stops supply of a current to the primary coil when detecting abnormality in the power receiving apparatus by detecting an input variation from the power supply whose variation width of magnitude of the input within a predetermined period of time becomes equal to or more than a predetermined value, based on the detection signal of the input detection section.

2. The contactless power transmission apparatus according to claim 1, wherein the predetermined value is greater than a variation width of magnitude of input within a predetermined period of time, the variation width being a variation width which occurs during normal operation.

3. The contactless power transmission apparatus according to claim 1, wherein the predetermined value has a first threshold and a second threshold having a variation width of magnitude of input greater than a variation width of magnitude of input of the first threshold, and when the variation width exceeds the first threshold but does not exceed the second threshold, the control section does not stop the supply of the current to the primary coil but decreases the supply of the current to the primary coil, and when the variation width exceeds the second threshold, the control section stops the supply of the current to the primary coil.

* * * * *